United States Patent [19]

Stringer

[11] Patent Number: 5,042,015
[45] Date of Patent: Aug. 20, 1991

[54] MEASURING METHOD AND APPARATUS

[75] Inventor: Bradley J. Stringer, Farmington, Utah

[73] Assignee: Quantronix, Inc., Farmington, Utah

[21] Appl. No.: 402,213

[22] Filed: Sep. 1, 1989

[51] Int. Cl.$^5$ ............................................. G01S 15/88
[52] U.S. Cl. .................................... 367/99; 367/96; 364/564
[58] Field of Search ............... 367/96, 99, 902, 103; 364/564, 567

[56] References Cited

U.S. PATENT DOCUMENTS

| | | | |
|---|---|---|---|
| 2,689,082 | 9/1954 | Kolisch | 364/564 |
| 3,154,673 | 10/1964 | Edwards | 364/564 |
| 3,184,969 | 5/1965 | Bolton | 367/902 |
| 3,436,968 | 4/1969 | Unger et al. | 364/564 |
| 3,588,480 | 6/1971 | Unger et al. | 364/564 |
| 3,819,918 | 6/1974 | Hale | 364/564 |
| 3,916,676 | 11/1975 | Boggs et al. | 73/609 |
| 4,029,176 | 6/1977 | Mills | 367/909 |
| 4,161,715 | 7/1979 | Harris | 367/107 |
| 4,237,737 | 12/1980 | Nitadori | 367/7 |
| 4,409,839 | 10/1983 | Taenzer | 73/625 |
| 4,528,651 | 7/1985 | Brock et al. | 367/99 |
| 4,543,649 | 9/1985 | Head et al. | 367/96 |
| 4,572,203 | 2/1986 | Feinstein | 424/9 |
| 4,601,207 | 7/1986 | Steblay | 73/597 |
| 4,714,846 | 12/1987 | Pesque et al. | 310/317 |
| 4,748,846 | 6/1988 | Haynes | 73/290 V |
| 4,757,716 | 7/1988 | Nottingham et al. | 73/623 |
| 4,773,029 | 9/1988 | Claesson et al. | 364/564 |
| 4,838,696 | 6/1989 | Pryor | 356/372 |
| 4,855,608 | 8/1989 | Peterson, II | 250/221 |

OTHER PUBLICATIONS

*Operator's Manual for Defense Depot Ogden*, Fairbanks Controls Operation, Feb. 4, 1985, pp. 1-6 and appended drawing #2-52723.

Primary Examiner—Daniel T. Pihulic
Attorney, Agent, or Firm—Joseph A. Walkowski

[57] ABSTRACT

The present invention comprises a method and apparatus for measuring the linear dimensions and determining the three-dimensional spatial volume of an object. In the preferred embodiment, all three linear dimensions are ascertained using the travel time of reflected ultrasonic waves. Measurements may be taken while the object is in motion, and the object may also be weighed.

29 Claims, 4 Drawing Sheets

MEASURING METHOD AND APPARATUS

BACKGROUND OF THE INVENTION

The present invention relates generally to the utilization of ultrasonic sound waves to take dimensional measurements of objects, and more specifically, to a method and apparatus for ascertaining three-dimensional measurements and/or volume of objects.

It is known in the art to use soundwaves to measure distances, thicknesses and even to generate holographic images. For example, U.S. Pat. No. 4,161,715 discloses an acoustic system for measuring the interior dimensions of a hollow body such as a cavern intersected by a wellbore. U.S. Pat. No. 4,748,846 discloses the use of ultrasound to determine the level of liquid, such as gasoline, in a storage tank; U.S. Pat. No. 4,601,207 employs ultrasonic means to measure the strain upon roof bolts in mines, stress effecting an elongation of the bolts which is determined from the increase in travel time of sound waves between locations on the bolts. U.S. Pat. No. 4,757,716 discloses a system for inspecting turbine and generator rotor bores using ultrasound, while U.S. Pat. No. 3,916,676 measures thickness of cable jackets using ultrasonic transducers placed about the outside of the cable. Ultrasonic location of a moveable object, for example a piston within a cylinder, is disclosed in U.S. Pat. No. 4,543,649, and in U.S. Pat. No. 4,029,176 acoustic waves are used to detect the presence of persons in a "zone of danger" between sliding doors, such as elevator doors, and prevent premature closing. U.S. Pat. Nos. 4,237,737, 4,409,839, 4,572,203 and 4,714,846 are each directed to aspects of ultrasonic imaging as it specifically pertains to medical applications.

While the above-noted patents utilize acoustic energy in various contexts involving dimensional measurement, there remains a void in the business world for a precise, rugged measurement system for inanimate objects.

For example, millions of packages per year are handled and shipped by United Parcel Service, Federal Express, and many other smaller courier and delivery services. These packages originate with federal, state and local governments, as well as private businesses of all sizes. In many instances, the charges by the carriers to their customers are based on the so-called "dim-weight factor" (DWF) of the article being shipped, a fictitious dimension based on length times width times height in inches divided by a standard divisor, commonly 166 (L$\times$W$\times$H $\div$166). The "166" divisor has been adopted by the International Air Transport Association. Even if an object or package is of irregular configuration, the dim-weight, using the longest measurement each of length, width and height, is still utilized for billing purposes.

The measurements of the articles shipped is also critical so that the carrier can accurately determine the number of trucks, trailers or other vehicles which will be required to transport goods to their destinations, and so both customers and carriers can accurately estimate their warehousing and other storage needs.

In addition, article weight and measurements are also used to determine and predict weight and balance for transport vehicles and aircraft, and to dictate the loading sequence for objects by weight and dimensions for maximum safety and efficiency.

Further, if orders of any items are to be packed into boxes, knowledge of object weight and dimensions would be useful for selecting box size and durability.

To date, it has been a common practice for the customer to manually "cube" or measure boxes or other articles with a ruler, yardstick or other straightedge marked with units of length, generally inches, perform a calculation for "dim-weight", and provide same to the carrier with the package. If the customer does not "cube" the articles, then the carrier performs the operation. Since these measurements and calculations are generally done hurriedly, there is an equal chance that the customer will be under or over-charged. To add to the problem, there are many packages and other objects not susceptible to even a grossly accurate manual measurement of dim-weight, for example, and not by way of limitation, loaded pallets, tubes, drums, reels of hose, cable or wire, etc. Many machine and automotive parts are shipped "naked" with tags attached, or at most bagged or shrink-wrapped. It is obvious to one skilled in the art that a straightedge measurement to ascertain the greatest extent of each dimension will not be accurate in any of these instances to any degree whatsoever.

It is known to the inventor that a "jig" type measuring system for packages has been used, with a base and two sides joining in a corner at 90° angles, each marked with gross dimensional units (to the nearest one inch) so that a cubic package can be placed on the base at the corner and measurements taken manually by looking at the markings and recording same, but again the accuracy is limited by the care and eyesight of the measurer, and the time utilized is unreasonably long when thousands of packages are being shipped, as with Sears, K-Mart, or other large retailers.

In short, the prior art has not provided a quick, accurate means and method for measuring packages and other objects in a commercial or industrial setting.

SUMMARY OF THE INVENTION

In marked contrast to the prior art, the present invention contemplates a method and apparatus for rapidly and accurately determining the length, width and height of packages and other objects utilizing ultrasonic waves.

One preferred embodiment of the invention comprises a dynamic measurement unit, wherein at least two ultrasonic emitter-receiver transducers or sensors are deployed at a measurement station, and measurements of width and height by the sensors are triggered by arrival of the object to be measured as it moves past the station without stopping. Length may be determined by a third ultrasonic sensor, or by other alternative means such as a triggered timing device.

A second preferred embodiment comprises a static measurement unit, wherein three transducers are fixed to a tri-armed jig, one at the end of each arm aimed inwardly toward the intersecting point of the arms, the object to be measured being placed on a base proximate the intersection of the arms, and the transducers triggered.

With both embodiments, weight of the object may also be taken simultaneously with its dimensions. In the first embodiment, a commercially available weighing means may be included at the station, while in the second embodiment, a load cell is placed under the base of the jig.

In both embodiments of the invention, the measuring (and optionally weighing) operations may be triggered and data accumulated and processed by computer means; bar code or other optical character recognition via an optical character recognition reader decodes identification of the objects measured to automatically correlate measurements to a specific package is also a feature of the invention.

Subsequent to the dimensional measurements, object volume or girth may be calculated, or the dimensions sorted to classify objects dimensionally for storage or transport purposes.

BRIEF DESCRIPTION OF THE DRAWINGS

The present invention will be more fully understood by one skilled in the art through a review of the following detailed description of the preferred embodiments, taken in conjunction with the accompanying drawings, wherein.

DETAILED DESCRIPTION OF THE PREFERRED EMBODIMENTS

Ultrasound technology is extremely safe, emitting no radiation; visible, ultraviolet or infrared light; audible sound; odor; or heat. Further, ultrasound, as used in the present invention, will not damage a package or its contents during the measurement operation. Finally, the sensor utilized in the present invention has no moving parts and is essentially maintenance free.

The preferred ultrasonic transducers or sensors employed with the present invention are electrostatic, although piezoelectric transducers may be employed. The preferred electrostatic sensors operate at a frequency of 49.6 kHz, with a maximum current draw of 130 milliamps at 12-17 volts DC. Suitable sensors are potted electrostatic transducers in stainless steel housings with circuit cards produced by Lundahl Instruments, 710 North 600 West, Logan, Utah 84321, while the transducer units themselves are manufactured by Polaroid and Texas Instruments. The sensors are operable over a temperature range of 0 to 50 degrees C., and at relative humidity levels of 90% or less, non-condensing. The higher frequency (>200 kHz) piezoelectric sensors are not preferred due to the fact that, while their resolution exceeds that of the electrostatic transducers, they are also highly directional so as to require multiple transducers to sweep a particular dimension if widely varying sizes of packages and package profiles are to be encountered. In addition, the directionality requires a precise orthogonality of the side of the object to be measured relative to the sensor.

Figure 1:
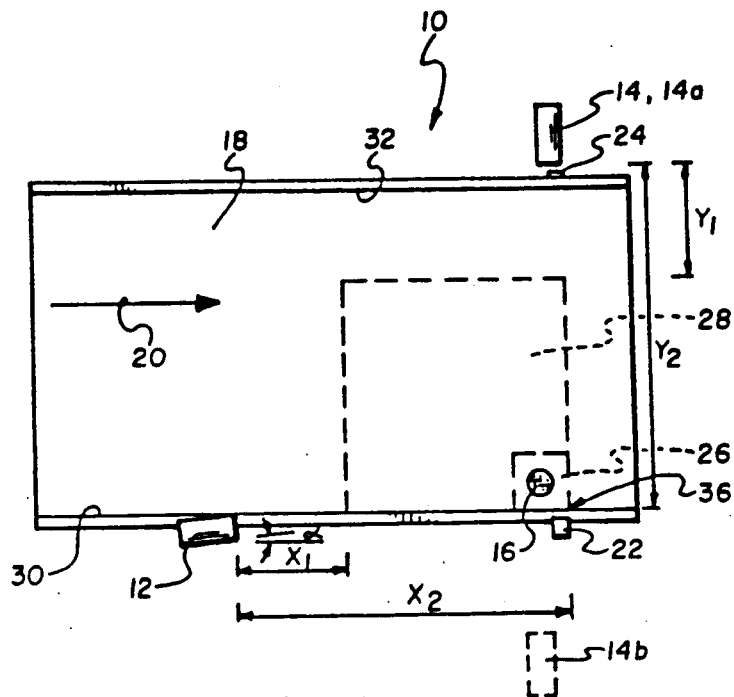
FIG. 1 comprises a schematic top elevation of a first preferred embodiment of the present invention.
Figure 2:
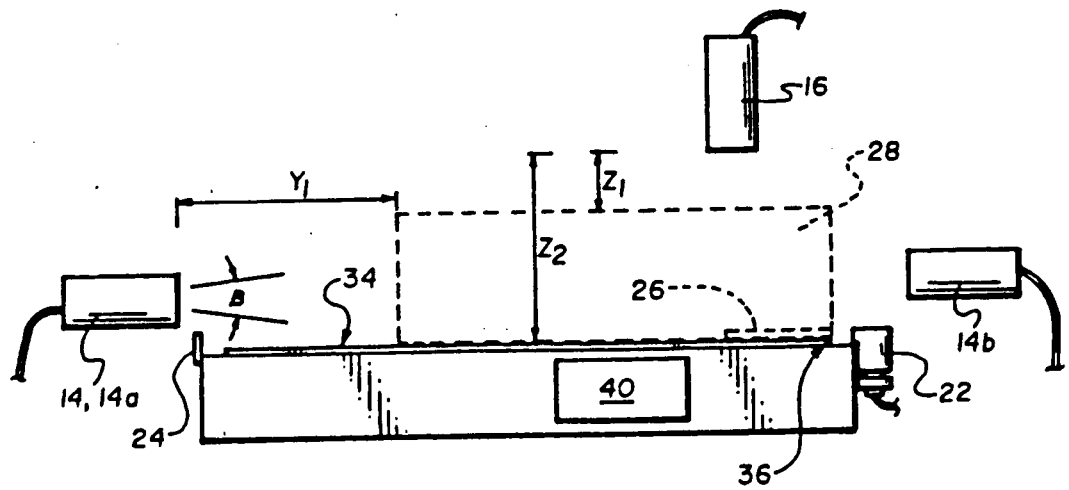
FIG. 2 comprises a schematic side elevation of the embodiment of FIG. 1.

Referring now to FIGS. 1 and 2 of the drawings, top and side views, respectively, of a first preferred embodiment of the invention are depicted in schematic form. Dynamic measurement unit 10 of the present invention comprises three ultrasonic transducers or sensors 12, 14 and 16, deployed at conveyor means 18, conveyor means 18 being a belt-type, roller type, tow line or other conveyor as known in the art. An automated guided vehicle (AGV) may also be employed to carry or move the object past the sensors. Sensors 12, 14 and 16 are functionally identical and interchangeable.

As shown by arrow 20 in FIG. 1, the direction of motion in this example is left to right. Given that orientation of movement, photocell 22 and retroreflector 24 are preferably mounted substantially in lateral alignment with sensors 14 and 16 so as to trigger a measurement when the leading edge of a large object 28 or a small object 26 interrupts the light beam between photocell 22 and reflector 24. Photocell 22 may be any commercially available photocell, preferably operating in the infrared polarized light range. Proximity sensors of various types, including but not limited to magnetic or capacitive, may also be employed. A suitable photocell polarized with a sunlight immunity of 10,000 foot candles is the Model 1456A-6517, manufactured by Opcon of 720 80th Street, S.W., Everett, Wash. 98203-6299. Polarization is desirable to eliminate problems with reflectivity of the object breaking the photocell beam.

Sensor 12, as shown, is utilized to measure the length of object 26 or 28, "length" being an arbitrary term used in this instance to designate the dimension of an object taken in a direction parallel to that of the direction of conveyor motion 20. Sensor 12, as shown in FIG. 1, is mounted horizontally and substantially parallel but at a slight angle $\alpha$ to the direction of motion of the conveyor means 18. Sensor 12 is mounted so that it is to the side 30 of conveyor means 18 with which objects 26, 28 have been previously aligned. Such alignment may be accomplished by any means known in the art, such as a set of angled, or skew, conveyor rollers upstream of station 10. The reason for this alignment will be explained hereafter in detail. The slight angular orientation and lateral offset of sensor 12 from conveyor means 18 is easily compensated for by simple geometrical calculations, it being appreciated that to place sensor 12 in alignment with the conveyor means motion would result in it being hit by objects thereon, or requiring some means to raise and lower the sensor or swing it into a position after the object has passed.

Sensor 14, as shown, is utilized to measure the width of object 26 or 28, "width" being an arbitrary term used in this instance to designate the dimension of an object taken in a direction horizontally perpendicular to the direction of conveyor motion 20. Sensor 14 is also mounted in a horizontal attitude, and to the side 32 of the conveyor means 18 opposite the side 30 thereof where object alignment has taken place. Sensor 14 should be mounted, as shown in FIG. 2, just high enough above the surface 34 of conveyor means 18 so that its ultrasonic waves will not be reflected by surface 34, but not so high that the waves, which spread in a generally conical pattern from the sensors with an included angle $\beta$ of seven to twelve degrees (shown greatly exaggerated in FIG. 2) will not miss the lowest object, such as small flat object 26, the width of which is to be measured by station 10.

Sensor 16, as shown, is utilized to measure the height of object 26 or 28, "height" being an arbitrary term used in this instance to designate the dimension vertically perpendicular to the direction of conveyor motion 20. Sensor 16 is mounted in a vertical attitude, and preferably adjacent to and to the inside of the side 30 of conveyor means 18 whereat alignment takes place. Of course, it should be placed above the surface 34 of conveyor means 18 at a height great enough so as to clear the tallest object placed on surface 34.

Once the sensors 12-16 have been mounted, a "zero point" for object measurement is established. This "zero point" 36 coincides with an object having zero length, zero width and zero height, and can be anywhere on the length of conveyor means 18, but must be, for this embodiment, on the side 30 where objects 26 or 28 are aligned.

After sensors 12-16 are mounted and the zero point 36 selected, the positions of sensors 12-16 are adjusted in response to placing a target object of known dimension in the measuring field or volume adjacent zero point 36, as shown in FIGS. 1 and 2, and triggering the sensors, then subsequently adjusting the sensor positions and resulting system output until it corresponds to the known values. A one foot cube, twelve inches on a side, is typically utilized as a reference. The dimensions of the object measured by sensors 12-16 are directly related to travel time of the ultrasonic waves emitted and reflected. For length sensor 12, the interruption of the infrared beam between photocell 22 and retroreflector 24 by the leading edge of the object to be measured triggers initial measurement of the distance $X_1$ between the face of sensor 12 and the trailing edge of the object to be measured.

Distance $X_1$ is then geometrically corrected for angle $\alpha$ to a true distance between sensor 12 and the trailing edge of the object, and subtracted from known distance $X_2$ between sensor 12 and zero point 36 to give the length dimension X of the object ($X = X_2 - X_1$).

To measure the width of an object, sensor 14 is triggered by photocell 22 and measures the distance $Y_1$, between the face of sensor 14 and the near side edge of the object. Since the distance $Y_2$ between sensor 14 and the zero point 36 at side 30 of conveyor means 18 is a known constant, the width Y of the object is equal to $Y_2 - Y_1$. In similar fashion, the height distance $Z_1$ is measured between the face of sensor 16 and the top of the object, and subtracted from the known distance $Z_2$ between sensor 16 and surface 34, to provide the height Z of the measured object.

It should be understood that the term "measure" does not necessarily indicate that only a single measurement is taken of each dimension by each sensor. In fact, measurements can be taken numerous times in a burst of ultrasonic waves which are emitted, reflected, and received. However, such multiple measurements are not deemed necessary and are therefore not preferred due to the additional time required. For example measurements may be taken sequentially for 0.17 second by each sensor at a rate of twelve times per second, and the resulting wave travel time signals for each sensor averaged to give a value $X_1$, $Y_1$ or $Z_1$. It is thus apparent that such an approach would take over 0.5 seconds for three dimensional measurement, a major consideration and a disadvantage when the object measured is moving at a high rate of speed. Utilizing the sensors previously referred to above, dimensional measurements can be taken with dynamic measurement unit 10 to an accuracy of ±0.1 inches.

Due to the fact that measurements are taken while the conveyor means 18 is carrying objects past dynamic measuring unit 10, it is necessary to compensate the length measurement for the speed of the conveyor means in some manner. An adjustment in data calculations by a microprocessor used to control unit 10 is one solution. The speed of conveyor means 18 is known as priori. The "lag time" between triggering and firing of the length sensor 12 is a constant which is calculated or measured. If the lag time is multiplied by the conveyor means speed, this produces the "lag distance", i.e., the distance an object will travel on conveyor means 18 between triggering and firing of sensor 12. The lag distance can then be added via the software in a processor to the sensed (incorrect) distance to yield true length.

A simpler and more preferred solution for conveyor speed compensation is to move photocell 22 and retroreflector 24 along conveyor means 18 upstream of zero point 36. If an object of known length is placed on conveyor means 18, a measurement triggered by photocell 22 is taken and the measured length is too short, photocell 22 is moved upstream from zero point 36. For a conveyor means carrying objects at 90 feet per minute past unit 10, the final photocell position will normally be 0.7 inches upstream of zero point 36.

In lieu of moving photocell 22, the position of length transducer or sensor 12 may be altered. If the article length is measured as it travels away from sensor 12 on conveyor means 18, sensor 12 can be moved downstream by the lag distance units of length. If article length is measured as it travels toward sensor 12, sensor 12 is also moved downstream by the lag distance.

Optionally, in lieu of utilizing ultrasonic sensor 12 for length measurement, length may be measured using the photocell 22, the triggering thereof by an object commencing a clock timing which, when correlated to the speed of the conveyor means, results in an accurate measurement of length directly related to the time between which photocell 22 is switched off by an object, and the time it is turned on again when the trailing edge of the object passes. The known speed of the object (conveyor speed) is multiplied by the "dark time" during which the light beam of photocell is interrupted, and the object length thereby ascertained. This technique may also be employed with the previously referenced proximity sensors.

While unit 10 has been described in terms of a single embodiment, other optional configurations are available and achievable. For example, instead of aligning objects with side 30 of conveyor means 18, they may be placed randomly anywhere on conveyor surface 34 so long as they are straight, or aligned with the direction of motion. In such an instance, two sensors, 14a and 14b, are placed directly opposite one another across conveyor means surface 34, and both are triggered at the same time, sensor 14a measuring a distance $Y_1$, 14b measuring distance $Y_2$, and $Y_1$ and $Y_2$ being subtracted from known distance $Y_3$ between the faces of sensors 14a and 14b to give width Y of the object.

Length sensor 12 may also be placed aiming upstream with respect to motion 20, and placement adjusted accordingly with respect to zero point 36. If software compensation is employed, the lag distance is then subtracted from the measured distance to arrive at the correct length.

If extremely wide or tall objects of uneven configuration are to be measured, such as pallets loaded with boxes or other merchandise, several sensors 14 and 16 may be placed at adjacent locations to cover the entire possible width or height to be encountered.

Finally, it may be desirable to simultaneously weigh the objects being measured at unit 10. For this purpose, weighing unit 40 may be placed under surface 34 of conveyor means 18, and triggered by photocell 22 in the same manner as sensors 14–16 by photocell 22. One suitable device for on-the-fly weighing is the Weigh-Tronix Model DS-3030A-01, manufactured by Weigh-Tronix of 1000 Armstrong Drive, Fairmont, Minn. 56031. Of course, the weighing device 40 utilized depends upon the design loads of unit 10.

If an AGV is utilized to move objects past sensors 12–16 of a unit 110, the weighing unit 40 may be placed under the floor and the scale tared to the weight of the unloaded AGV.

It should be noted that ultrasonic waves generated by sensors 12, 14 and 16 of the type employed in the present invention are affected in their travel time by temperature, barometric pressure and humidity, and that it is therefore desirable to compensate for variations in same when processing the measured travel times. Such compensation can be via look-up tables in a computer memory or by microprocessor correction using known equations for the effects of these variables. However, the preferred method of the present invention is to use the wave travel time for a known distance to compensate for these effects.

For example, in dynamic unit 10 and in subsequently-described static measurement unit 110, the height measurement sensor 16 is triggered when no object is present in the measuring field or volume. The height sensor is utilized because of the large target presented by the conveyor surface (unit 10) or platen (unit 110), as the case may be. Since the distance between the face of sensor 16 and the target is known, the number of "ticks" of the high frequency clock in the control system 202 associated with the present invention per inch of measured distance can be computed. For example, if the nominal time per unit distance round trip in "ticks per inch" is 590, using a clock frequency of 4 MHz, and a measurement by sensor 16 of a known 30 inch distance therefore normally produces 17,700 "ticks" of travel time, in the event that the travel time takes 17,730 "ticks", the system self-adjusts to utilize 591 "ticks per inch" as the time per unit distance reference to accommodate a longer wave travel time. This corrected figure is then applied to the actual object measurements made using sensors 12–16 in order to produce a more accurate result.

The calibration of the system is self-commanded upon startup (see FIG. 7), and is periodically repeated in response to software commands or, optionally, may be induced periodically by a timer circuit command.

It is also desirable to provide an override for measurements in excess of the maximum design dimension to be measured falling in the "near field space" in front of the sensors, as the travel time of the reflected ultrasonic waves is too short for accurate processing, given reaction time lags in the sensors and processing equipment. Therefore, it is desirable to provide so-called "blanking zones" for a certain distance in front of the sensors, where no measurements will be taken for wave travel times below a certain minimum. Finally, it is desirable to adjust the sensitivity of the sensors to respond as receivers only to a minimum amplitude of reflected signal or echo from the objects being measured, in order to avoid spurious measurements attributable to other objects or structures within range of the sensor.

Figure 3:
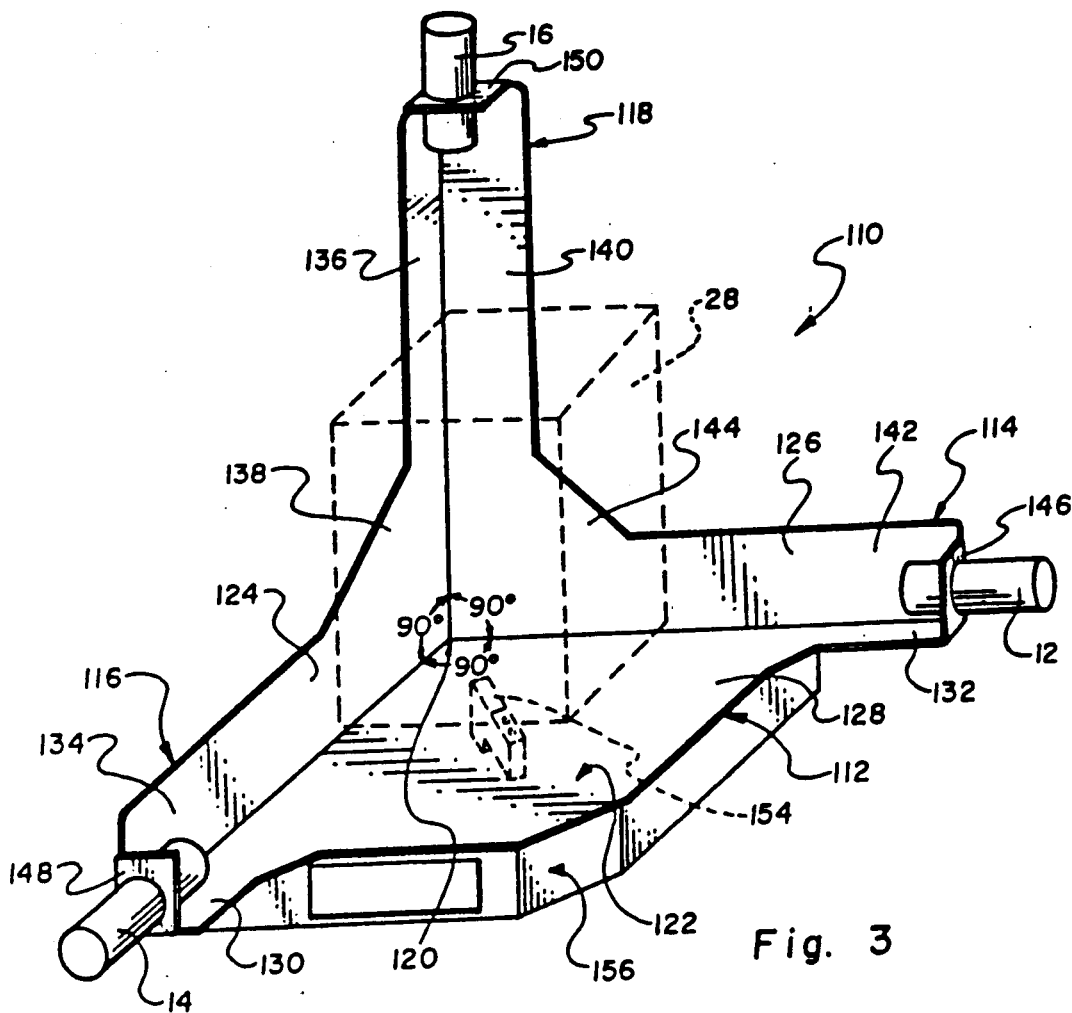
FIG. 3 comprises a perspective elevation of a second preferred embodiment of the present invention.
Figure 4:
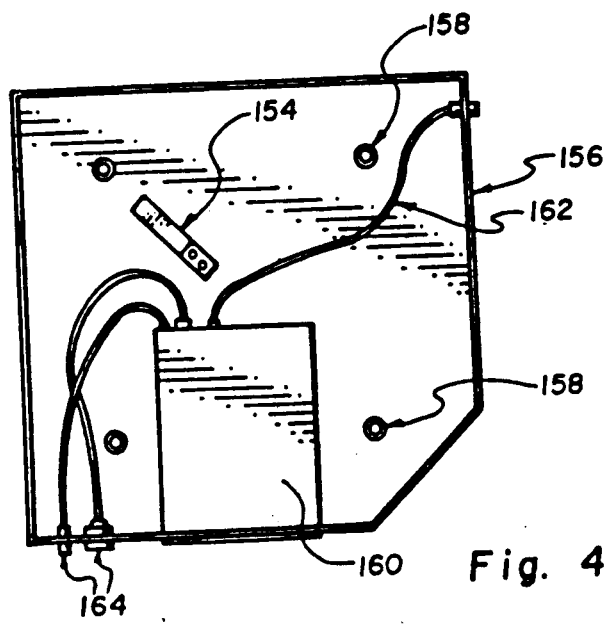
FIG. 4 comprises a top elevation of the embodiment of FIG. 3 with the jig removed from the support housing.

Referring now to FIGS. 3 and 4 of the drawings, stationary measuring unit 110 will be described in detail. Unit 110 includes the same basic components as unit 10, but in a substantially different configuration. As in unit 10, sensors 12, 14 and 16 measure the length, width and height of a small object 26 or large object 28, and are preferably identical to those of unit 10. In this instance, however, the sensors are mounted on a jig 112. Due to the measured object being stationary while measurements are taken, the accuracy of unit 110 is greater than that of dynamic unit 10, and may approach ±0.01 inches.

Jig 112 comprises three arms, 114, 116, and 118, disposed at mutually perpendicular angles to one another, so as to join at corner 120, which also serves as the "zero point" for unit 110. Jig 112 is fabricated from heavy gauge sheet stock, such as anodized aluminum, and comprises base 122, left side 124 and right side 126. Base 122 includes object support platen 128, and arm extensions 130 and 132. Left side 124 includes arm extensions 134 and 136 which meet at crotch 138. Right side 126 includes arm extensions 140 and 142, which meet at crotch 144. Arm extensions 132 and 142 join at a 90° angle and coextensively form arm 114, arm extensions 130 and 134 join at a 90° angle and coextensively form arm 116, and arm extensions 136 and 140 joint at a 90° angle and coextensively form arm 118. At the end of each arm, sensor mounting plates 146, 148 and 150 hold sensor 12, 14 and 16, respectively, in positions parallel to their respective arms 114, 116 and 118 and aimed inwardly at zero point 120.

Jig 112 is mounted on support housing 156 via load cell 154, which is shown in broken lines under base 122. Support housing 156, like jig 112, is fabricated of heavy gauge sheet stock. Load cell 154 is preferably a high precision steel type load cell, and a suitable model using a dual bridge strain gage is Model #60048A, available from Sensortronics of 677 Arrow Grand Circle, Covina, Calif. 91722. Load cell 154 is rigidly anchored at its bottom to the bottom of support housing 156, as by bolts, and its offset top to base 122, again as by bolts. Load cell 154 is designated to accept off-center loads, and so is ideally suited for its application in unit 110 where, as shown in FIG. 3, object 28 has a length greater than its width. However, it was unexpectedly discovered that load cell 154 could be utilized as the single weighing means with unit 110 even if the load is significantly off-center without a noticeable diminution of accuracy so long as the horizontal axis of the load cell is oriented toward the zero point 120 of unit 110 and on a line of symmetry at the midpoint (45°) of the 90° angle between arms 114 and 116. The distance of load cell 154 from the zero point 120 is important, as is the direction load cell 154 is facing (either toward or away from zero point 120), due to the differing amounts of torque exerted on load cell 154 by platen 128 and the object being measured. However, the foregoing is not as critical as the alignment symmetry of the load cell.

Support housing 156 is equipped with four small screw-type jack stands 158 to accommodate loads in excess of the rated capacity of load cell 154 so as to prevent damage thereto. Support housing also accommodates integral electronics 160 for unit 110, which will be described further hereafter. Internal electronics 160 comprises a rack-mounted assembly slidably disposed behind cover plate 160 of support housing 156, the assembly communicating with sensors 12, 14 and 16 via cables 162 and connectors 164 as is well known in the art, connectors 164 mating with other connectors and cables (not shown) running outside support housing 156 to the sensors, to a power supply and to external electronics, which may include a bar code reader, triggering switches, a host computer, and/or a display means, such as a printer or LED display, etc.

After the dimensions of an object are measured, the volume thereof may be computed, the dimensions added to determine girth of the object, or may be sorted to classify objects as to one or more dimensions. As noted previously, weight may also be ascertained with unit 10 or unit 110.

The dimensional data may, of course, be displayed via LED or other displays as known in the art, and calculated by hand. However, it is preferable that the measuring and calculating operations by controlled and performed by a programmed processor. It will be understood by those skilled in the art that English or metric units may be employed in displays or other outputs, as well as in calculations.

Figure 5:
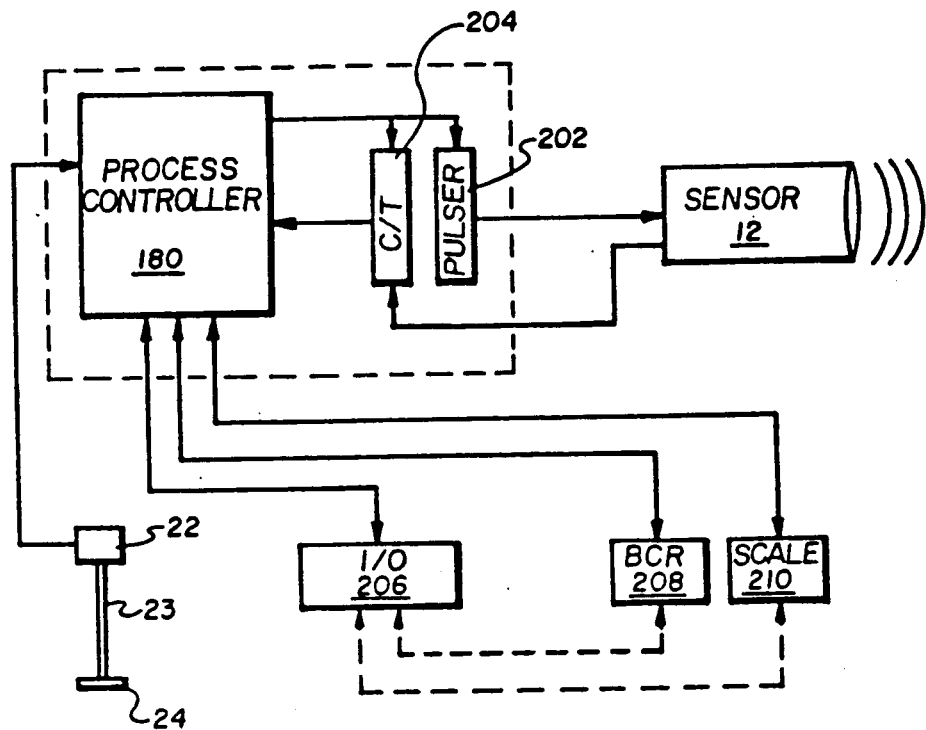
FIG. 5 comprises a macro schematic for the electronics associated with the present invention.

One potential control and processing system for sensors 12, 14, 16 is schematically depicted in FIG. 5. The system as depicted includes a single transducer or sensor, designated by way of example as 12, which is ultimately controlled by a process controller 180. Unit 180 does, in fact, control sensors 12, 14 and 16, but for simplicity's sake only a single sensor is shown. Sensor 12 is triggered by the interruption by an object of the beam 23 between photocell 22 and retroreflector 24 (FIG. 5) in the instance of unit 10, and by the operator in the case of unit 110. Process controller 180, in response to photocell 22, produces a trigger signal, sent to pulser 202 and counter/timer 204, causing pulser 202 to transmit an activation signal to sensor 12 and counter/timer 204 to start counting. If static measurement unit 110 is being controlled, pulser activation may be triggered by a timer, footswitch, software command or other suitable means via unit 180. The pulser signal causes sensor 12 to transmit an ultrasonic signal burst toward the object to be measured. Generally, each burst of ultrasonic signals comprises one to four signals. It is desirable, as noted previously, to provide a variable amplitude control which may be provided in pulser 202 or controlled by unit 180, but is preferably included in sensor 12. Pulser 202 signals sensor 12 via electrical cable (not shown in FIGS. 1-4) in a manner well known in the art. The ultrasonic signals are reflected from the object to be dimensionally measured, and received by sensor 12, whereupon they are converted to electrical signals. Sensor 12 contains signal detection circuitry to convert the electrical signals to signals suitable for manipulation by process controller 180. Such circuitry is known in the art and includes means for adjusting sensitivity such as a variable threshold circuit, a variable amplifier for increasing the amplitude of signals relayed to the processor from the sensor, and/or (as noted above) circuitry for boosting the amplitude of the pulser signals sent to the sensor.

Signals received by sensor 12 from the object reflecting the ultrasound waves are amplified by an amplifier therein and wave-shaped by a comparator associated therewith, with the latter being synchronized with the incoming signals from pulser 202 so that the comparator output is always positive. The gain of the amplifier and the threshold of the comparator are preferably controllable at sensor 12.

As noted above, timer 204 is controlled by a start input from process controller 180 and a stop input from sensor 12. When pulser 202 is triggered by unit 180, counter/timer 204 is started, and when an output signal is received from sensor 12, counter/timer 204 is stopped. Thus, the time interval between a transmitted sensor pulse and the receipt of a reflected sensor signal is measured, and output to process controller 180, wherein the time interval is converted first to a distance and then to a dimension of the measured object. Of course, system delays (i.e., time lags due to circuitry and components) must be compensated for as known in the art, unless the outgoing signal time lags and incoming signal time lags cancel.

Process controller 180 communicates with input/output means 206, which can comprise a host computer such as any commercially available personal computer or, a dumb terminal, in more sophisticated operations, a larger computer controlling numerous measuring stations. The output of the unit 180 can be digitally displayed, as on a computer screen or via LED display, can be produced as hardcopy via printer, or can be relayed to memory (RAM, hard disc, floppy disc) associated with an input/output means 206, and/or transmitted to any other location desired.

In order to correlate a measurement series (length, width, height) and calculated volume or total dimensions with a particular object measured, bar code reader (BCR) 208 is utilized to read a bar coded sticker or label affixed to the object measured, either before or after the measurement has taken place. Bar code reader 208 preferably outputs to process controller 180, but may alternatively output to input/output means 206.

As noted previously, both units 10 and 110 may optionally incorporate a weighing means or scale to weigh the object measured simultaneously with the dimensional measurement. Preferably, weighing means 210 is triggered by process controller 180 and outputs thereto, and then dimensions, volume and weight output from process controller 180 to input/output means 206. Weighing means 210 may alternatively provide weight data directly to input/output means 206 in a form readable by means 206 for display, memory, or further transmission.

Figure 6:
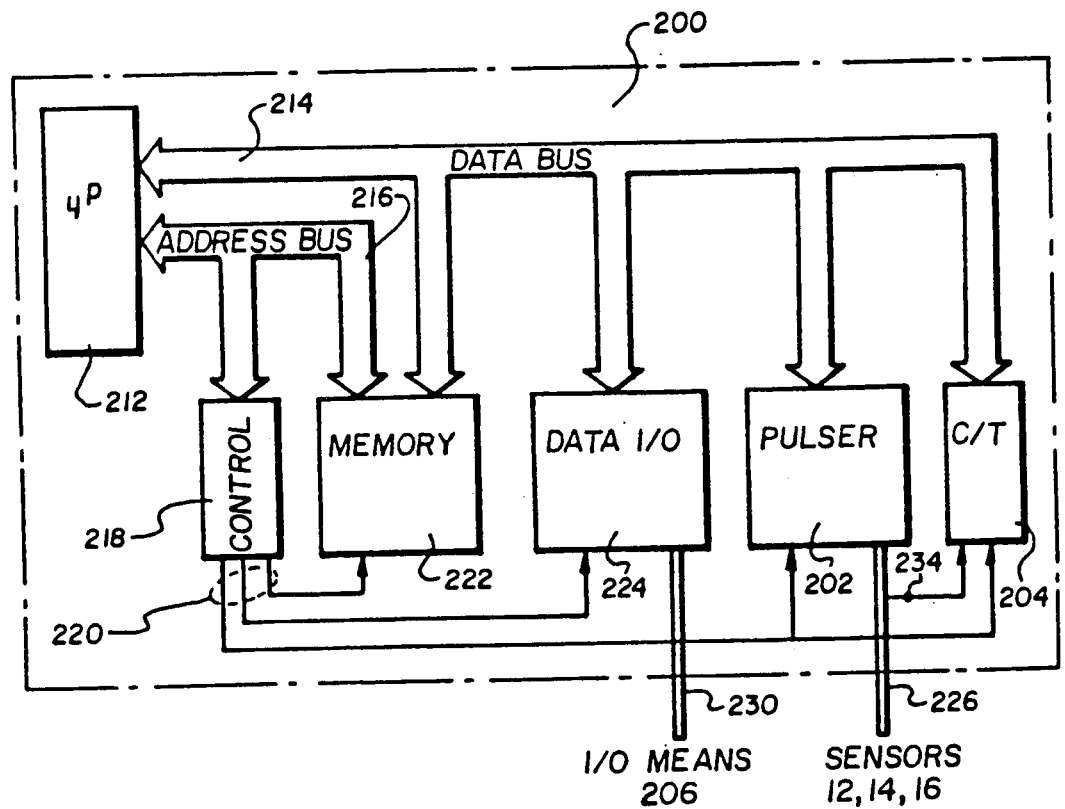
FIG. 6 comprises a block diagram of the control unit associated with the present invention.

While process controller 180 has been referred to merely as a single component, it will be understood by those skilled in the art that the term "process controller" may, and in fact does, encompass a plurality of components, including a microprocessor, memory, data bus, address bus, timing and control bus, registers and an interface device such as an input/output controller. The process controller may be custom-built for use with unit 10 or 110, or may be a commercially available unit programmed to act in the manner desired. In any event, the hardware involved is well known to those skilled in the art. FIG. 6 depicts a preferred embodiment of a control unit 200 in the form of a block diagram, wherein all of the component elements of process controller 180, pulser 202 and counter/timer 204 are all incorporated as a part thereof.

Referring to FIG. 6, the preferred embodiment of the control unit 200 associated with the present invention includes a number of components known in the microprocessor/computer art, the major ones which will be discussed below. Briefly, control unit 200 includes a central processing unit (CPU) 212, address bus 216, data bus 214, a control circuit 218 which commands memory 222, data input/output 224, pulser 202, and counter/timer 204 via timing and control lines 220 (which may also be referred to as a timing and control bus 220).

Control unit 200 communicates with an input/output means 206 as previously noted, via bus or cable 230, while pulser 202 communicates with sensors 12, 14 and 16 via bus or cables 226. It should be noted that sensor output signal line 234 extends from bus 226 to provide a "stop" signal to the counter/timer 204 as previously described with respect to FIG. 5.

CPU 212 preferably comprises an 8 bit Zilog Z84C00 microprocessor. Address bus 216 and data bus 214 are entirely conventional and will not be described in detail. Control circuit 218 includes one or more address decoders and a plurality of logic gates (latches) to control, via lines 220, the type and sequence of operations performed by the system as determined by CPU 212. Memory 222 preferably comprises two 8 kbit×8 EPROM's, one serving as storage for the mathematical operations performed by the system, and one as storage for the program master memory for CPU 212. In addition, memory 222 preferably includes an 8 kbit ×8 static RAM for temporary data storage and calibration factors used in correcting sensor measurements. Data input/output 224 preferably comprises a Zilog Z84C42 Serial Input/Output Controller and a MAX232 Signal Driver, produced by Integrated Maxim Products, 120 San Gabriel Drive, Sunnyvale, Calif. 94086, for modifying the system's TTL protocol to RS-232. Pulser 202 comprises a conventional tri-state latch for sequentially triggering sensors 12, 14 and 16. Counter/timer 204 includes a plurality of conventional line buffers and drivers, and a Zilog 284C30 Counter/Timer Circuit, including a 4 MHz clock. Counter/timer 204, via the serial input/output controller, determines the communication baud rate of the RS-232 interface, in this instance preferably 9600 baud. The counter/timer circuit can also be employed to initiate periodic maintenance routines to auto-zero the system, or, as in the preferred embodiment, such initiation can be software-commanded.

The program language is Z80 assembly as dictated by the selection of the Z84C00 CPU, although the numerical processing portion of the program using floating point arithmetic is in "C", cross-compiled to Z80 assembly.

It will be appreciated by those skilled in the art that many alternative circuit components, and other program languages, may be employed in and with the present invention. The foregoing specifically-noted elements have been provided by way of example only, and are not to be construed as in any way limiting the present invention thereto.

Preferably, the input/output means 206 communicates with control unit 200 via an RS-232 cable, modem, or other suitable interface utilizing an EIA RS-232-C serial communication protocol and employing encoded ASCII or EBCDIC. Other protocols may be employed, such as IBM bisynchronous, 3270, SNA, HDLC, SDLC and others. If control unit 200 is used with a host computer, control unit 202 recognizes and responds to the following commands from input-output means 206:

M—Measure. This command may be sent by the host computer, or may be initiated directly via a signal from photocell 22 in the case of dynamic memory unit 10, or from a hand or foot switch in the case of static measuring unit 110.

I—Install. This command sets up and calibrates the sensors upon initial installation of the unit.

C—Calibrate. This command, issued by the host computer 206, or self-commanded by control unit 200 after an object is measured, causes control unit 200 to trigger height sensor 16 and to subsequently perform internal humidity and temperature compensation as heretofore described.

R—Reset. This command, which may be entered manually on control unit 200 via a push button, or received from host computer 206, clears all registers and wait conditions in the control unit, and causes control unit 200 to recalibrate itself.

T—Test. This command causes the measurement process to start and repeat until any other command is received.

S—Send Status. Received from host computer 206. Control unit 200 normally responds "0", for okay, meaning communications between the two via RS-232 interface are operable.

B—Bad transmission. Host computer 206 sends to control unit when transmission therefrom was garbled or otherwise not understood. Control unit 200 then re-transmits the last data field to host computer 206 from buffer memory. Conversely, control unit 200 will send a "B" to the host computer 206 if a command is not received properly or not understood.

Control unit 200 will also recognize certain command set output qualifiers, which are set by sending a qualifier letter from the host computer and remain in effect until the same letter is sent again, until the system is reset, or at system power-up.

D—Display count. This causes transmission of certain register counts for diagnostic purposes.

A—Actual measurement. Will cause control unit 202 to send an actual measurement, even if less than a preset minimum threshold value.

E—Error output. Causes control unit 200 to send a signal to host computer 206 if there is a hardware error in sensor 12, 14 or 16.

The foregoing commands are exemplary only, are not to be construed as defining or otherwise limiting the commands which may be employed with control unit 200 or the present invention as a whole.

Figure 7:
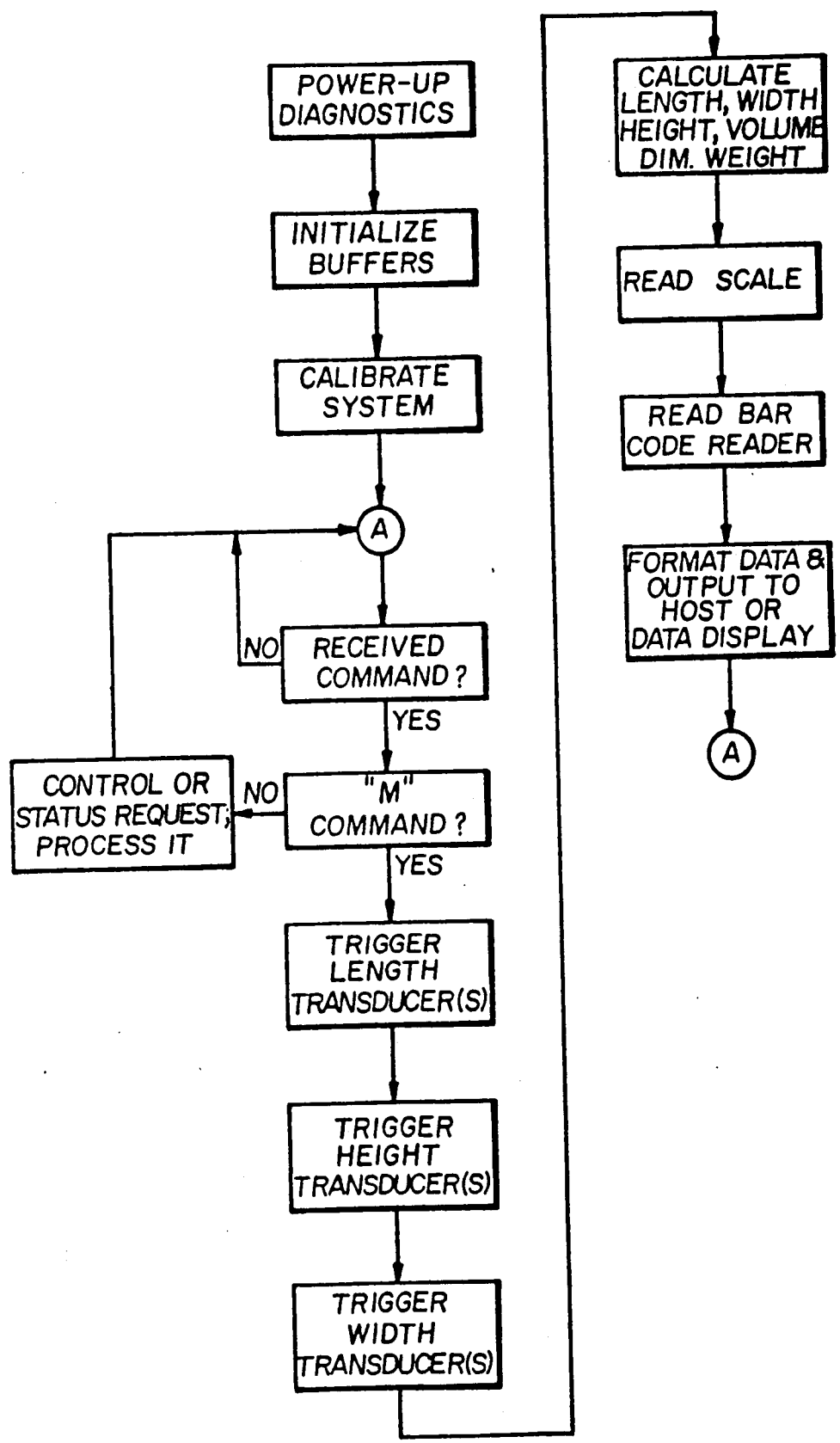
FIG. 7 comprises a flow chart of the operating sequence of the present invention.

FIG. 6 comprises a flow chart of the operation of unit 10 or unit 110. The chart is generally self-explanatory, the exception being the "control or status request" block, wherein sensor status may be queried, the display format altered, or the output units (metric, English) changed. It will be noted that the length measurement is triggered first, which is desirable in unit 110 due to the movement of the measured object. Measuring length first reduces the amount of transducer or photocell movement or software correction required to compensate therefor. Height and width measurements may interchangeably be made subsequent to length, and the scale or other weighing means is triggered last to permit, in either unit 10 or 110, the system to stabilize from the weight and/or impact of the object reaching the scale portion of the conveyor or hitting the platen. The bar code may be read last as shown in FIG. 7, first, or at any other time.

It will be appreciated that the low power draw of the present invention, less than one ampere, renders the system easily adaptable to battery power, and in fact commercially available non-interruptable power devices such as are generally used to power heights and equipment during power failures may be employed as power sources for portable installation of the present invention.

It is thus apparent that a novel and unobvious measuring unit has been described. Many additions, deletions and modifications to the preferred embodiments may be made without departing from the spirit and scope of the claimed invention.

I claim:

1. An apparatus for measuring an object, comprising:
   three ultrasonic transducer means, each having an emitter and a receiver associated therewith and oriented in substantially mutually perpendicular relationship to define a three-dimensional volume of greater extent in each dimension than that of the largest object to be measured, said ultrasonic transducer means each being aimed across said volume to measure a mutually perpendicular dimension of said object;
   trigger means for selectively activating the emitter of each of said transducer means to take a dimensional measurement when said object is located substantially in front of that transducer means;
   timer means for determining travel time between the generation of an ultrasonic wave by each emitter and the receipt of said wave by its associated receiver after reflection from said object;
   correlation means for correlating said travel times to linear distances;
   computing means for determining the dimensions of said object from said linear distances; and
   data collection means for collecting said dimensional measurements.

2. The apparatus of claim 1, further comprising transducer mounting means including a three-armed jig, each arm of said jig being substantially perpendicular to the other arms and said arms joining at a common point, each transducer means being supported by one arm and aimed in substantially parallel relationship thereto toward said common point.

3. The apparatus of claim 2, wherein two of said arms are substantially horizontally disposed and said jig further includes planar base means extending between said two arms below said transducer means supported thereby.

4. The apparatus of claim 3, further including support housing means below said base means and load cell means interposed between said support housing means and said base means, said load cell means being rigidly secured to both and supporting said jig.

5. The apparatus of claim 4 wherein said load cell means comprises a single load cell located under said base means on a line extending midway between said two horizontally disposed arms.

6. The apparatus of claim 1, further including computing means adapted to compute the spatial volume of said object by multiplying said three measured dimensions.

7. The apparatus of claim 1, further including conveyor means to linearly move said object through said volume at a substantially continuous rate, wherein said trigger means includes means responsive to the passage of said object through said volume to cause said trigger means to activate said emitters while said object is in motion through said volume.

8. The apparatus of claim 7, further including weighing means associated with said conveyor means adapted to weigh said object while it is in motion, said weighing means being responsive to said trigger means.

9. The apparatus of claim 7, further including alignment means associated with said conveyor means upstream of said volume adapted to align said object parallel to one side of said conveyor means.

10. The apparatus of claim 7, wherein all three transducer means are substantially aimed at a common zero point proximate one side of the conveyor means path.

11. A method of measuring an object, comprising:
    generating ultrasonic waves;
    causing said ultrasonic waves to strike said object from three mutually perpendicular directions while said object is in continuous linear motion;
    detecting said waves after reflection from said object;
    measuring the time between said generation and said detection of the waves in each of said directions;
    converting said times to linear distances; and
    converting said linear distances to linear dimensions of said object.

12. The method of claim 11, further including the step of electronically sensing the presence of said object prior to generating said ultrasonic waves.

13. The method of claim 11, further including the step of weighing said object while it is in motion and substantially concurrently with said measuring process.

14. The method of claim 13, wherein said step of weighing is performed after said ultrasonic waves are generated.

15. The method of claim 11, wherein said linear dimensions are measured in a direction parallel to said motion and in two directions mutually perpendicular thereto, said measurements are taken sequentially and said parallel measurement is taken first.

16. The method of claim 11, further including the step of calibrating the conversion of said times to linear distances by causing ultrasonic waves to strike a target a known distance from a wave generation point, measuring the travel time to and from the target, and adjusting a time to distance conversion standard accordingly.

17. The method of claim 11, further including the step of computing the spatial volume of said object by multiplying said linear dimensions.

18. A method of measuring an object, comprising:
    mounting said object in a stationary position;
    generating ultrasonic waves;
    weighing said object immediately following said generating of said ultrasonic waves without object movement;
    causing said ultrasonic waves to strike said object from three mutually perpendicular directions;
    detecting said waves after reflection from said object;
    measuring the time between said generation and said detection of the waves in each of said directions;
    converting said time to linear distances; and
    converting said linear distances to linear dimensions of said object.

19. The method of claim 18, further including the step of calibrating the conversion of said times to linear distances by causing ultrasonic waves to strike a target a known distance from a wave generation point, measuring the travel time to and from the target, and adjusting a time to distance conversion standard accordingly.

20. The method of claim 18, further including the step of computing the spatial volume of said object by multiplying said linear dimensions.

21. An apparatus for measuring an object, comprising:
    two ultrasonic transducer means, each having an emitter and a receiver associated therewith and oriented in substantially mutually perpendicular relationship to define a two-dimensional field of greater extent in each dimension than that of the largest object to be measured, said ultrasonic transducer means each being aimed across said field to measure a mutually perpendicular dimension of said object;

a third ultrasonic transducer means having an emitter and a receiver associated therewith for measuring a third dimension of said object in a direction substantially mutually perpendicular to said first two measured dimensions;

trigger means for selectively activating each of said transducer means to take a dimensional measurement when said object is in proximity thereto;

timer means for determining travel time between the generation of an ultrasonic wave by each emitter and the receipt of said wave by its associated receiver after reflection from said object;

correlation means for correlating said travel times to linear distances;

computing means for determining the dimensions of said object from said linear distances; and data collection means for collecting said dimensional measurements.

22. The apparatus of claim 21, further including conveyor means to linearly move said object through said field at a substantially continuous rate, wherein said trigger means includes proximity sensor means responsive to the passage of said object through said field to cause said trigger means to activate said emitters of said two transducers while said object is in motion through said field and to activate the emitter of said third transducer means.

23. The apparatus of claim 22, further including weighing means associated with said conveyor means adapted to weigh said object while it is in motion, said weighing means being responsive to said trigger means.

24. The apparatus of claim 22, further including alignment means associated with said conveyor means upstream of said field adapted to align said object parallel to one side of said conveyor means.

25. The apparatus of claim 21, further including conveyor means to linearly move said object through said field at a substantially continuous rate, wherein said trigger means includes means responsive to the passage of said object through said field to cause said trigger means to activate said emitters while said object is in motion through said field.

26. The apparatus of claim 25, further including weighing means associated with said conveyor means adapted to weigh said object while it is in motion, said weighing means being responsive to said trigger means.

27. The apparatus of claim 26, further including alignment means associated with said conveyor means upstream of said field adopted to align said object parallel to one side of said conveyor means.

28. The apparatus of claim 21, wherein all three transducer means are substantially aimed at a common zero point proximate one side of the conveyor means path.

29. The apparatus of claim 21, further including computing means adapted to compute the spatial volume of said object by multiplying said linear dimensions.

* * * * *

UNITED STATES PATENT AND TRADEMARK OFFICE
CERTIFICATE OF CORRECTION

PATENT NO. : 5,042,015

DATED : August 20, 1991

INVENTOR(S) : Bradley J. Stringer

It is certified that error appears in the above-identified patent and that said Letters Patent is hereby corrected as shown below:

Column 12, line 63, "heights" should read -- lights --.

Signed and Sealed this

Nineteenth Day of January, 1993

*Attest:*

DOUGLAS B. COMER

*Attesting Officer*  *Acting Commissioner of Patents and Trademarks*

(12) EX PARTE REEXAMINATION CERTIFICATE (7597th)
United States Patent
Stringer

(10) Number: US 5,042,015 C1
(45) Certificate Issued: Jul. 13, 2010

(54) MEASURING METHOD AND APPARATUS

(75) Inventor: Bradley J. Stringer, Farmington, UT (US)

(73) Assignee: Quantronix, Inc., Farmington, UT (US)

Reexamination Request:
No. 90/009,095, Apr. 15, 2008

Reexamination Certificate for:
Patent No.: 5,042,015
Issued: Aug. 20, 1991
Appl. No.: 07/402,213
Filed: Sep. 1, 1989

Certificate of Correction issued Jan. 19, 1993.

(51) Int. Cl.
*G01S 15/88* (2006.01)
*G01S 11/14* (2006.01)

(52) U.S. Cl. .............................. 367/99; 367/96; 702/156
(58) Field of Classification Search .................. None
See application file for complete search history.

(56) References Cited

U.S. PATENT DOCUMENTS

| 2,689,082 A | 9/1954 | Kolisch |
| 2,708,368 A | 5/1955 | Kolisch |
| 3,588,480 A | 6/1971 | Unger et al. |
| 4,419,384 A | 12/1983 | Kane et al. |
| 4,719,605 A | 1/1988 | Eder et al. |

OTHER PUBLICATIONS

Fairbanks Controls Operation, Operator's Manual for Defense Depot Ogden, Feb. 4, 1985, 7 pages.

*Primary Examiner*—Jimmy T Nguyen

(57) ABSTRACT

The present invention comprises a method and apparatus for measuring the linear dimensions and determining the three-dimensional spatial volume of an object. In the preferred embodiment, all three linear dimensions are ascertained using the travel time of reflected ultrasonic waves. Measurements may be taken while the object is in motion, and the object may also be weighed.

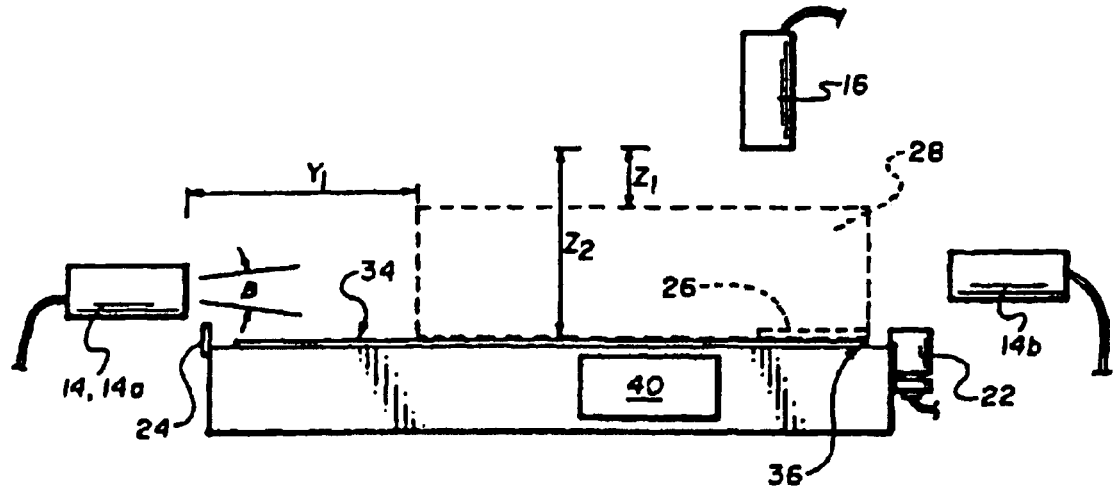

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentablity of claims 1-29 is confirmed.

* * * * *